United States Patent Office 2,751,097
Patented June 19, 1956

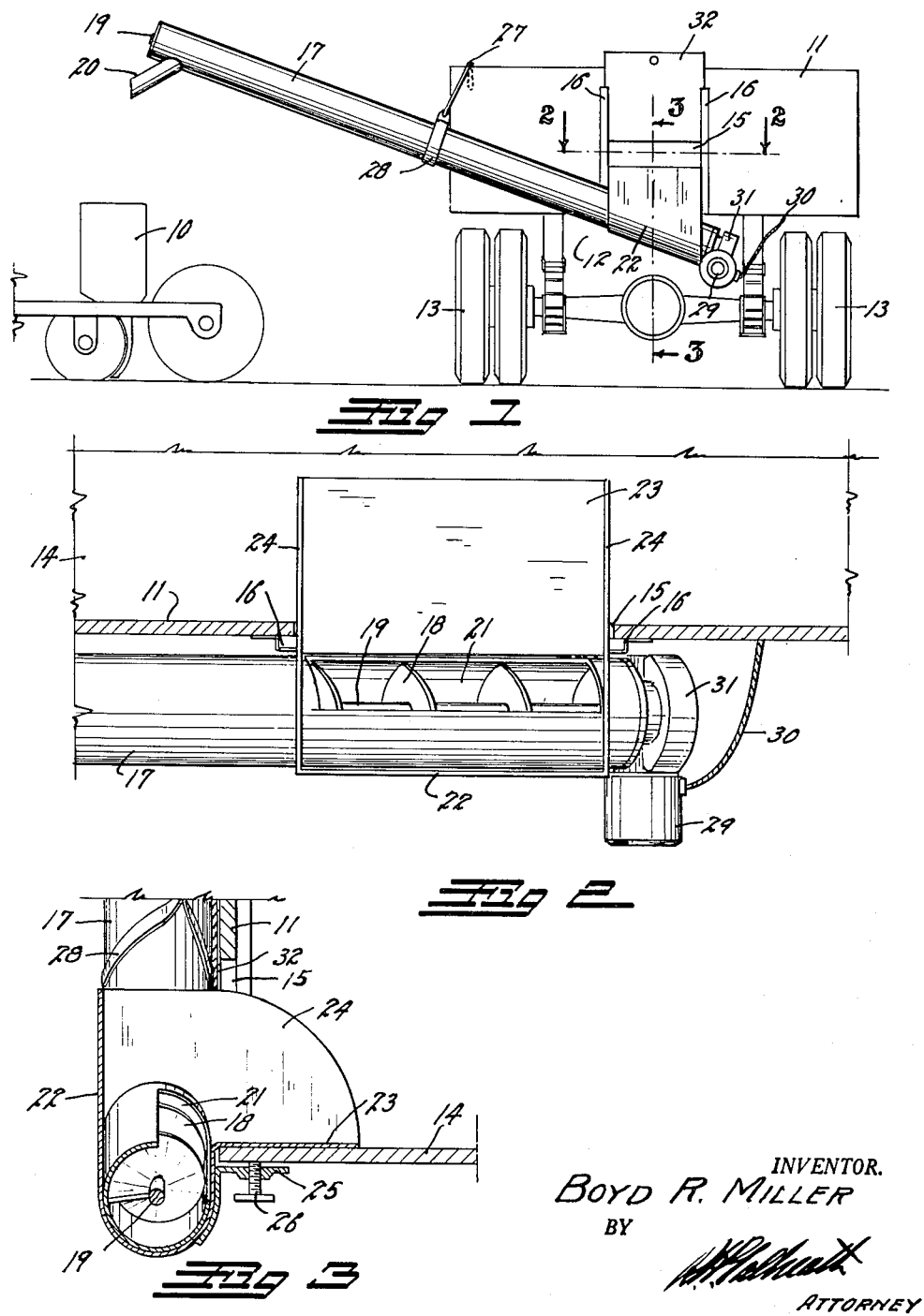

2,751,097

GRAIN DRILL LOADER ATTACHMENT FOR TRUCKS

Boyd R. Miller, Denver, Colo.

Application March 8, 1954, Serial No. 414,595

2 Claims. (Cl. 214—83.32)

This invention relates to a device for unloading grain from trucks, and more particularly to a device for filling grain drills from a truck. The principal object of the invention is to provide a simple, lightweight, portable attachment which can be quickly and easily attached to a conventional grain truck and operated from the electrical system of the truck to receive grain from the latter and elevate the grain to an elevated position where it will flow into the feed box of a conventional grain drill.

Another object of the invention is to so construct the device that it can be quickly and easily pushed into position in the discharge door of a conventional grain truck without the use of tools and without requiring any changes in the truck construction.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a rear elevation of a typical grain truck, illustrating the invention in place thereon;

Fig. 2 is an enlarged horizontal section through the tail gate of the truck, taken on the line 2—2, Fig. 1; and Fig. 3 is a similarly enlarged vertical section, taken on the line 3—3, Fig. 1.

In Fig. 1, a conventional grain drill has been diagrammatically indicated at 10, the tail gate of a conventional grain truck body at 11 with its chassis at 12 supported on the usual wheels 13. The floor of the truck is indicated in Fig. 3 at 14. The tail gates of the usual grain trucks are provided with centrally located discharge openings 15 normally closed by a vertically opening gate plate 32 slidably mounted in gate slides 16.

The improved unloader employs a cylindrical conveyor tube 17 containing a scroll conveyor 18 surrounding a conveyor shaft 19. The conveyor is designed to elevate grain to a discharge chute 20 for delivery into the grain bin of the drill 10. The tube 17 is cut away adjacent its lower extremity to provide a grain entrance port 21.

A hopper plate 22 is welded or otherwise secured about the lower portion of the conveyor tube 17 adjacent the grain port 21. The hopper plate extends vertically upward at the rear side of the tube 17 to prevent grain from overflowing the tube, and extends horizontally forward on the front side of the tube 17 to form a flat-bottomed scoop 23 provided with upturned side plates 24. The width of the scoop is slightly less than the width of the usual tail gate opening 15 so that it can be forced forwardly through the opening to rest upon the truck floor 14 beneath the grain load therein.

The conveyor tube can be attached to the tail gate 11 or chassis 12 in any desired manner. As illustrated, it is provided with a clamping jaw plate 25 which extends forwardly beneath the rear extremity of the floor 14 and which may be clamped to the latter by means of a suitable clamp screw 26. The conveyor tube extends sidewardly and upwardly from the hopper plate 22 beyond and above the body of the truck. The projecting extremity of the conveyor tube 17 is supported by means of a tail gate hook 27 which is hingedly mounted upon a band 28 clamped about the tube 17.

The conveyor shaft 19 is driven from a low voltage, direct current electric motor 29 provided with a speed reduction unit 31 mounted on the lower extremity of the conveyor tube 17. The motor 29 is provided with an electrical extension cord 30 which is designed to be detachably connected to the battery or electrical system of the truck in any convenient manner.

The improved unloader is applied to the truck by simply lifting the tail gate plate 32 and pushing the scoop 23 through the opening 15 into the grain and along the floor 14. The hook 27 is then hooked over the tail gate, the clamp screw 26 tightened, and the current turned on to the motor 29. The grain will flow from the body through the port 21 into the conveyor tube 17 and will be continuously conveyed to the discharge spout 20 as long as the electrical current is supplied.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A grain drill loader attachment for grain vehicles of the type having a tail gate with a grain discharge opening therein, comprising: an inclined cylindrical conveyor tube; a scroll conveyor rotatably mounted in said tube; a grain entrance port formed in the forward side of said tube adjacent the lower extremity thereof; means for attaching said tube to said vehicle on an incline at the rear of said tail gate and parallel to the latter, with said grain entrance port facing toward said grain discharge opening in said tail gate; an intake scoop formed on said tube about said grain entrance port and projecting forwardly therefrom; a flat, horizontal bottom plate in said scoop adapted to pass through said grain discharge opening and lie flat on the bottom of said vehicle and acting to form a sub-bottom in said opening; upturned side plates on said bottom plate adapted to pass through said grain discharge opening at each side thereof; and means for driving said scroll conveyor.

2. A grain drill loader attachment as described in claim 1 having a vertical hopper plate secured to said tube rearwardly of said grain discharge opening to prevent grain flowing through said grain discharge opening and overflowing said conveyor tube, said side plates extending rearwardly over said conveyor tube to an attachment with said hopper plate.

References Cited in the file of this patent

UNITED STATES PATENTS

| | | |
|---|---|---|
| 2,431,000 | Step | Nov. 18, 1947 |
| 2,470,836 | Piper | May 24, 1949 |
| 2,481,860 | Miller | Sept. 13, 1949 |
| 2,506,684 | Saboe | May 9, 1950 |
| 2,572,099 | Bateman | Oct. 23, 1951 |
| 2,656,034 | Filsinger et al. | Oct. 20, 1953 |